United States Patent
Liu et al.

(10) Patent No.: US 11,063,781 B2
(45) Date of Patent: Jul. 13, 2021

(54) SYSTEM AND METHOD FOR DOWNLINK OFDMA FOR RELIABLE MULTICAST AND BROADCAST TO WORKGROUP BRIDGE (WGB) BRIDGED NETWORK

(71) Applicant: Cisco Technology, Inc., San Jose, CA (US)

(72) Inventors: Jun Liu, Shanghai (CN); Jing Wang, Shanghai (CN); Yong Wang, Shanghai (CN); Kathy Xia Ke, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/660,447

(22) Filed: Oct. 22, 2019

(65) Prior Publication Data

US 2021/0119815 A1    Apr. 22, 2021

(51) Int. Cl.

| | |
|---|---|
| *H04L 12/18* | (2006.01) |
| *H04L 12/46* | (2006.01) |
| *H04L 12/66* | (2006.01) |
| *H04W 40/22* | (2009.01) |
| *H04W 84/12* | (2009.01) |

(52) U.S. Cl.
CPC ........ *H04L 12/189* (2013.01); *H04L 12/4641* (2013.01); *H04L 12/66* (2013.01); *H04W 40/22* (2013.01); *H04W 84/12* (2013.01)

(58) Field of Classification Search
CPC ... H04L 12/189; H04L 12/4641; H04L 12/66; H04W 40/22; H04W 84/12
See application file for complete search history.

(56) References Cited

U.S. PATENT DOCUMENTS

| | | | |
|---|---|---|---|
| 8,204,055 B2 | 6/2012 | Bichot et al. | |
| 8,934,420 B2 | 1/2015 | Sivaprakasam | |
| 8,971,322 B2 | 3/2015 | Olsson et al. | |
| 9,313,095 B2 | 4/2016 | Chapman et al. | |
| 2006/0007930 A1 | 1/2006 | Dorenbosch | |
| 2012/0087315 A1* | 4/2012 | Sivaprakasam | H04L 61/6022 370/329 |

OTHER PUBLICATIONS

IEEE publication title "DirCast: A Practical and Efficient Wi-Fi Multicast System", by Chandra et al, pp. 161-170 (Year: 2009).*

* cited by examiner

*Primary Examiner* — Thai Nguyen
(74) *Attorney, Agent, or Firm* — Merchant & Gould P.C.

(57) ABSTRACT

Systems and methods herein can convert downstream group addressed packets to unicast packets and send them to Workgroup Bridges (WGBs) by Downlink (DL) Multiple-User (MU) Orthogonal Frequency Division Multiple Access (OFDMA) (DL-MU-OFDMA). A Wireless Controller (WLC)/Access Point (AP) can extend current Inter-Access Point Protocol (IAPP) messages for broadcast and deploy Internet Group Management Protocol (IGMP) processing for multicast messages. The APs can maintain WGB entries for each group address. When there is a downstream broadcast packet received at the AP, the AP can search the entries in the domain and can build a 4-address unicast packet for each WGB, then transmit those converted packets in parallel by DL-OFDMA. After receiving those converted packets over the air, the WGB simply rebuilds 802.3 packets and forwards the 802.3 packets to the corresponding VLAN domain.

14 Claims, 10 Drawing Sheets

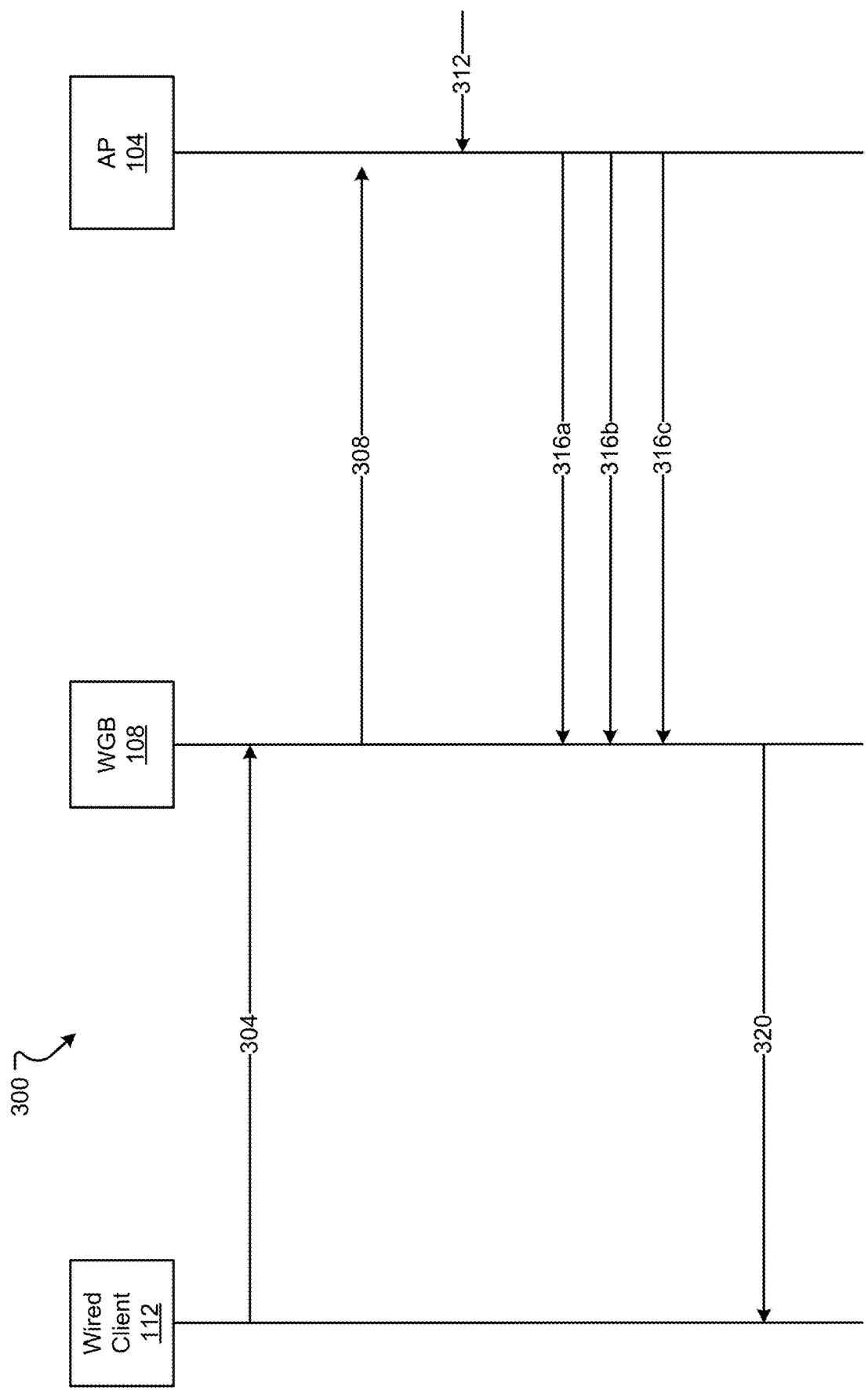

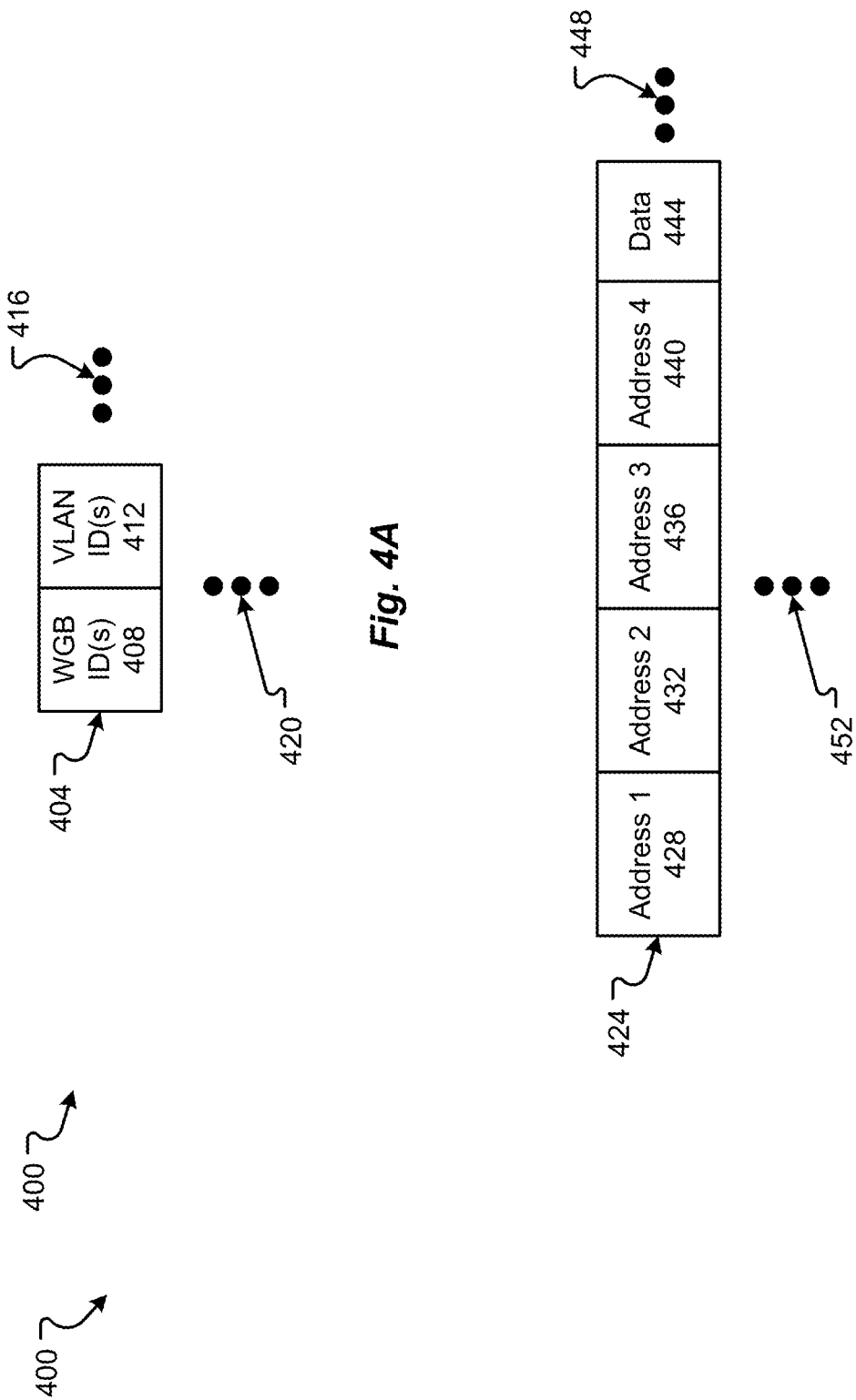

SYSTEM AND METHOD FOR DOWNLINK OFDMA FOR RELIABLE MULTICAST AND BROADCAST TO WORKGROUP BRIDGE (WGB) BRIDGED NETWORK

TECHNICAL FIELD

An exemplary aspect is directed toward communications systems. More specifically an exemplary aspect is directed toward IEEE (Institute of Electrical and Electronics Engineers) 802.11 wireless communications systems.

BACKGROUND

Wireless systems employ processes to manage the radio resources of the wireless devices to optimize receipt and transmission of data. One type of device that may rely on the wireless systems for communication is an Internet Of Things (IOT) device. IOT communications have demanding requirements for downstream multicast and broadcast transmissions that may be targeted for a Workgroup Bridge (WGB) bridged network. In a WGB configuration, wired client devices can connect, through a wired connection, to the WGB. The WGB to client device connections may support multiple Virtual Local Area Network (VLAN) configurations.

In a VLAN configuration, a customer system can have a control center that may send group-addressed packets to WGBs, then each WGB bridge relays those packets to wired devices connected to the WGB. This kind of application is deployed in manufacturing facilities, for autopilot in fleet vehicles, etc. These applications often demand a reliable, contemporaneous, and no loss transmission of group addressed packets, arriving on all WGBs, to the client devices. However, transmission of group addressed packets is often not reliable because those packets cannot be retransmitted if the original transmission fails.

These above scenarios present challenges in send data to WGB-connected devices.

SUMMARY

Aspects herein can comprise systems and methods receiving, at an Access Point (AP), a broadcast packet destined for two or more client stations (STAs). The client STAs can be connected to a WGB. The AP can modify the broadcast packet into two or more packets, wherein the two or more packets are addressed to the two or more client STAs separately. Then, the AP can send the two or more packets to the WGB to relay the two or more packets to the two or more client STAs.

BRIEF DESCRIPTION OF THE FIGURES

FIG. 3A illustrates a signaling process in accordance with aspects of the current disclosure;

FIG. 4A illustrates data structure that may be received, stored, retrieved, managed, etc., in accordance with aspects of the current disclosure;

FIG. 4B illustrates another data structure that may be received, stored, retrieved, managed, etc., in accordance with aspects of the current disclosure;

Figure 1:
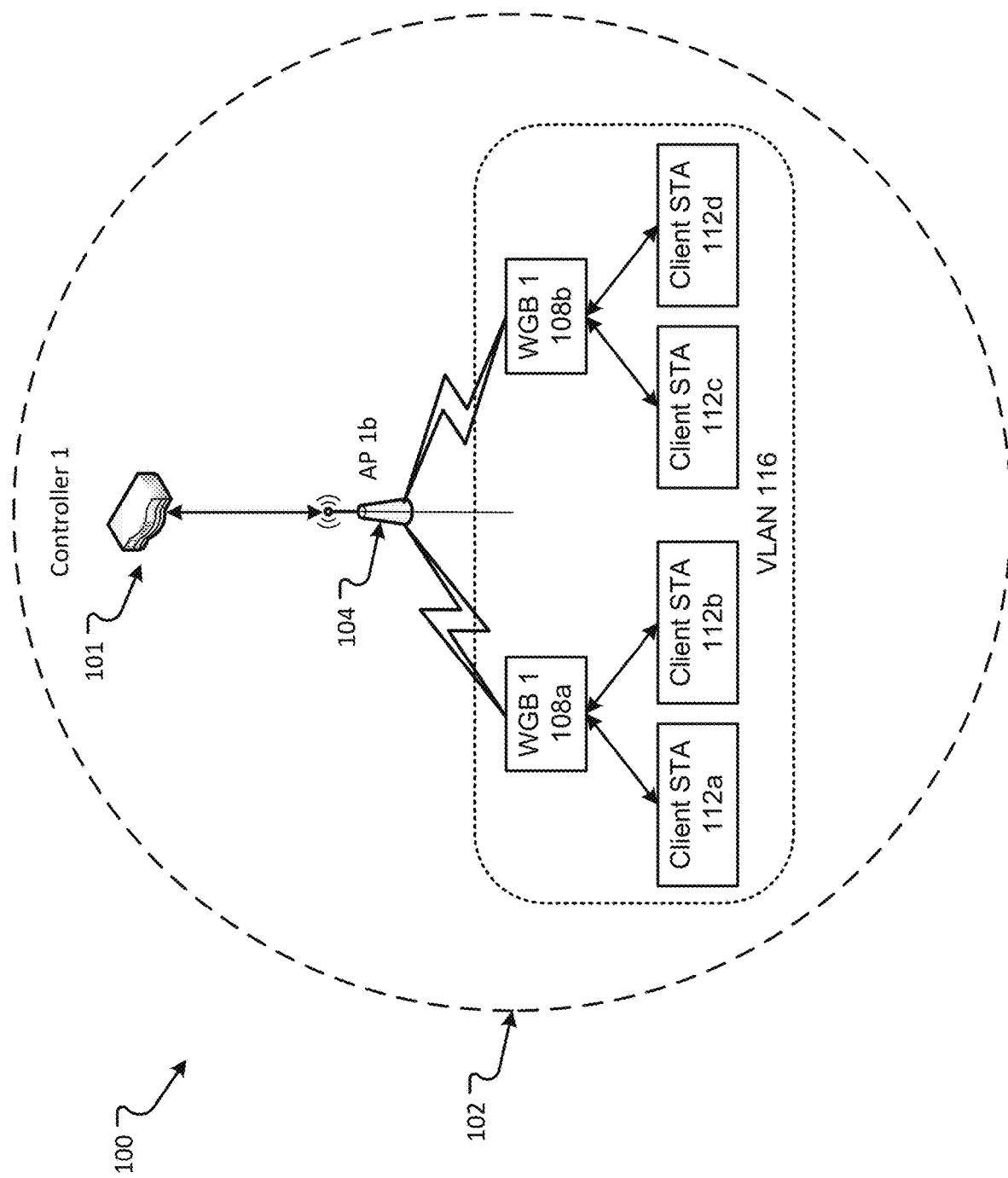
FIG. 1 illustrates an environment having a Virtual Local Area Network (VLAN) having one or more Working Group Bridges (WGBs) in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

Aspects herein can convert downstream group addressed packets to unicast packets and send them to WGBs by Downlink (DL) Multiple-User (MU) Orthogonal Frequency Division Multiple Access (OFDMA) (DL-MU-OFDMA), which results in reliable and better latency across multiple clients associated with the WGB.

In aspects, the start of broadcast service can be controlled by a Join/Leave protocol of wired client to Wireless LAN (WLAN). Once the wired clients are associated to the WLAN, changes to how the packets are sent to the wired clients can be made. For example, a four (4) address unicast format for each WGB is created to send packets. The new format can add the WGB address to Address 1 field (Receiver Address (RA)) and add the original group address to the Address 3 field (Destination Address (DA)).

To generate new frame format for each WGB, a Wireless Controller (WLC)/Access Point (AP) can extend current Inter-Access Point Protocol (IAPP) messages for broadcast and deploy Internet Group Management Protocol (IGMP) processing for multicast messages. The APs can maintain WGB entries for each group address. WGB may then send IAPP messages for each wired client during association, the WLC can intercept this association message and add the wired client to the corresponding WLAN.

WGB entries can be built on each AP for each VLAN domain (the Multicast Group Identifier (MGID) is stored for central switching and the bridge group is stored for local switching) and for each VLAN wired client, belonging to the parent WGB. When there is a downstream broadcast packet received at the AP, the AP can search the entries in the VLAN domain and can build a 4-address unicast packet for each WGB, then transmit those converted packets in parallel by DL-OFDMA in 802.11ax. After receiving those converted packets over the air, the WGB simply rebuilds 802.3 packets by copying 802.11 destination address into the 802.3 packets and forwards the 802.3 packets to the corresponding VLAN domain.

A more detailed set of steps of the process above can begin when a WGB joins/roams to a Basic Service Set (BSS) Identifier (ID) (BSSID). The WGB can send a IAPP message to the WLC for the wired clients connected to the WGB. The IAPP message may already contain VLAN information that can be used to send upstream unicast packets. This message format can be extended for downstream broadcast packets to integrate the transmission methods. The information in the IAPP add message can allow the AP to build a specific WGB entry in a data store. The WGB entry can be mapped to one VLAN broadcast domain. Further, the IAPP delete message of all wired clients in one VLAN can allow the AP to remove a specific WGB entry in a VLAN broadcast domain.

Next, if a wired client "behind" the WGB is capable of using an IGMP stack, the wired client can be added into a corresponding multicast group triggered by a IGMP Join/Leave message. The WLC can then add the WGB to the data rather than wired client. This change does not need any change to the WGB when forwarding the IGMP message, as the WLC already can map between the wired client and the parent WGB.

If a wired client, behind the WGB, is not capable of using an IGMP stack, but still requires multicast service, the WGB may reuse existing manual bridge configurations by adding WGB entries into the group address. Then, the WGB can send this information by IAPP message. In this way, the WLC/AP can build corresponding entries for legacy wired client that are not capable of using an IGMP stack.

When wired clients, behind the WGB, are in one VLAN, downstream broadcast and multicast packet can be converted into 4-address unicast packet, where the DA is inserted into the original group address and the RA represents each WGB. If wired clients, behind the WGB, are in several VLANs, downstream multicast packets can be converted as above. Downstream broadcast packets, in these situations, can include other conversions because there may be no snooping on the WGB side and the 802.11 packet cannot include the corresponding tag. To keep the 802.11 frame format unchanged, the WLC/AP may convert the broadcast address to a multicast address, whose Least Significant Bit (LSB) field contains the VLAN value. For example, the converted multicast address may be 01:00:5e:80:xx:xx, where xx:xx is the VLAN value embedded in the address. This specific multicast can then be converted and sent as usual multicast packets. When the WGB receives this specific multicast, the WGB can separate the message from normal Internet Protocol Version 4 (IPV4) multicast address as that address cannot be mapped by IPV4 multicast address. The WGB may then convert this multicast back to a broadcast and forward the broadcast packet with the correct VLAN.

The downlink OFDMA exchange between the AP and the WGB may not be changed substantively. However, the AP can replicate the same broadcast/multicast Physical Layer Convergence Procedure (PLCP) Protocol Data Unit (PPDU) for all WGBs in each group. The AP can allocate the same Resource Unit (RU) for the WGBs in the group.

The process above is detailed below. First, the AP can assign the OFDMA group RU based on a number of WGBs using each radio. The 802.11ax protocol allows a minimum OFDMA group of 26 sub-carriers (about 2 MHz) channel with data rates up to about 14 Mbps. A max of 9 groups can be assigned. There may be less than 6 WGBs covered by one AP, by which 6 groups can be transmitted in parallel. If WGB numbers are larger than 9, the AP can split some WGB transmission into the same OFDMA group and send packets in one OFDMA group one by one because OFDMA transmissions can be changed on a packet-by-packet basis. In each transmission, there may be a max of 9 parallel transmission for the converted group address packet.

Then, the OFDMA group is also assigned, even in situations where there is one WGB 108 is associated with the VLAN 116. The assignments are to assure low latency and avoid possible duplication from original group-addressed packets. One OFDMA group can reduce the collision on the channel bandwidth. Also, original group-addressed packets can also be sent to legacy wireless client. Without OFDMA group, the WGB 108 can receive both original group-addressed packets and converted unicast packets, which can then both be received by wired clients, which may receive duplicated packets.

A Multiple User (MU) Ready To Send (RTS) (MU-RTS) frame functions as a trigger frame from the AP 104 to synchronize uplink Clear-To-Send (CTS) responses from the WGBs 108. RUs are also allocated by the MU-RTS. The WGBs 108 can send CTS responses in parallel using the assigned RUs. After receiving parallel CTS responses from the WGBs 108, the AP 104 can then begin multi-user transmissions for the converted group-addressed packets. The AP 104 can then send a Block ACK Request (BAR) frame followed by the WGBs 108 replying with Block ACKs in parallel.

The 4-address format can also relieve the WGB 108 from differentiating downstream group-addressed packets and AP-reflected upstream group addressed packet. WGB 108 can find whether the received packet is a downstream packet or a reflection of an upstream group addressed packet, with a 3-address format that can have a same DA address for both packets. The 4-address format packet can let the WGB 108 easily find the MAC address by checking RA field.

These devices, systems, processes, etc. will be explained in more detail below.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with an IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

Example Embodiments

FIG. 1 illustrates an example of an operating environment associated with aspects herein. An environment 100 including a basic service set 102 having one or more work group bridges (WGBs) 108 may be as shown in FIG. 1. The environment 100 may include a basic service set 100 that can include a controller 101 in communication with one or more access points (APs) 104. The AP 104 may then be in communication with one or more work group bridges 108a, 108b. The work group bridges 108 may be part of one or more Virtual Local Area Networks (VLANs) 116. Each work group bridge 108 may be also connected to one or more client Stations (STAs) 112a through 112d. These client stations 112 can be connected by wired connection to the WGB 108. As such, the WGB 108 functions as a wireless link between the AP 104 and the client STAs 112. Messages can be sent from the AP 104 to be transmitted to the WGB and then forwarded to client STAs 112 over the wired links.

The WLAN environment 100 may comprise a BSS 102 that may include a master station or controller 101, one or more APs 104a-104d, and one or more devices or STAs 108. The master station 101 may be an AP using the IEEE 802.11 protocol(s) to transmit and receive. Hereinafter, the term AP will be used to identify the controller 101, but the configurations may not be limited to the AP performing the functions described herein as a separate controller may also perform the functions.

Figure 7:
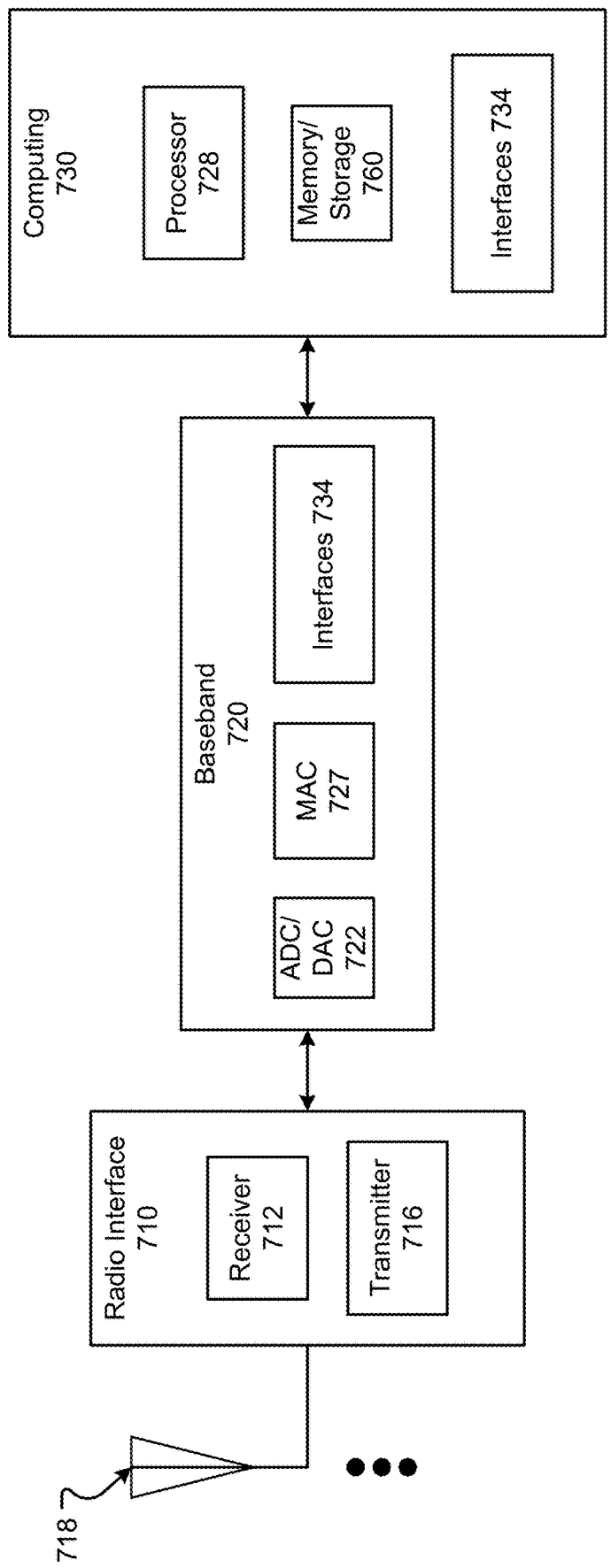
FIG. 7 illustrates an embodiment of a station, WGB, client, or AP in accordance with aspects of the current disclosure.

The AP 104 may be a base station and may use other communications protocols as well as the IEEE 802.11 protocol. The IEEE 802.11 protocol may include using OFDMA, Time Division Multiple Access (TDMA), and/or code division multiple access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 7.

The WGBs 108 may include one or more High-Efficiency Wireless (HEW) (as illustrated in, e.g., the IEEE 802.11ax standard) WGBs and/or one or more legacy (as illustrated in, e.g., the IEEE 802.11n/ac standards) WGBs. The WGBs 108 may be wireless devices that may be transmitting and receiving using an IEEE 802.11 protocol. In the operating environment, an AP 104 may generally manage access to the wireless medium in the WLAN for the WGB 108.

Within the environment 100 including the BSS 102, one or more WGBs 108 may associate and/or communicate with the AP 104 to join the WLAN. Joining the WLAN may enable WGBs 108 to wirelessly communicate with each other via an AP 104, with each other directly, with the AP 104, or to another network or resource through the AP 104. In some configurations, to send data to a recipient, a sending WGB may transmit an Uplink (UL) Physical Layer Convergence Procedure (PLCP) Protocol Data Unit (PPDU) comprising the data, to AP 104, which may then send the data to the recipient WGB 108, in a Downlink (DL) PPDU. The PLCP is the physical layer protocol that is used with 802.11 and other standards.

In some configurations, a frame of data transmitted between the WGBs 108 or between a WGB 108 and the AP 104 may be configurable. For example, a channel used for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 108, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

When managing access to the wireless medium in the WLAN 100, the AP 104 may schedule medium access, for the sending WGB 108, during a UL time interval, during which the AP 104 may refrain from transmitting over the wireless medium. The UL time interval may comprise a portion of a Transmit Opportunity (TXOP) owned by AP 104.

At a given point in time, multiple WGBs 108, in the WLAN 100, may wish to send data. In some configurations, rather than scheduling medium access for WGBs 108 in different respective UL time intervals, the AP 104 may schedule medium access for WGBs 108 to support UL MU transmission techniques, according to which multiple WGBs 108 may transmit UL MU PPDUs to the AP 104 simultaneously during a given UL time interval. For example, by using UL MU OFDMA techniques during a given UL time interval, multiple WGBs 108 may transmit UL MU PPDUs to the AP 104 via different respective OFDMA Resource Units (RUs) allocated by the AP 104. In another example, by using UL MU-MIMO techniques during a given UL time interval, multiple WGBs 108 may transmit UL MU PPDUs to the AP 104 via different respective spatial streams allocated by the AP 104.

To manage access, the AP 104 may transmit a HEW master-sync transmission, which may be a Trigger Frame (TF) or a control and schedule transmission, at the beginning of the control period. The AP 104 may transmit a time duration of the TXOP and sub-channel information. During the HEW control period, HEW WGBs 108 may communicate with the AP 104 in accordance with a non-contention based multiple access technique, such as OFDMA or MU-MIMO. This HEW technique is unlike conventional WLAN communications in which devices communicate in accordance with a contention-based communication technique, rather than a multiple access technique. During the HEW control period, the AP 104 may communicate with stations 108 using one or more control frames, and the WGBs 108 may operate on a sub-channel smaller than the operating range of the AP 104.

During the HEW master-sync transmission, the WGBs 108 may contend for the wireless medium with the legacy devices 108 being excluded from contending for the wireless medium during the HEW master-sync transmission. The TF used during this HEW master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, WGBs 108, in the WLAN 100, may need to receive data to forward to client STAS 112. Again, rather than scheduling medium access for WGBs 108 in different respective DL time intervals, the AP 104 may schedule medium access for WGBs 108 to support DL MU transmission techniques, according to which multiple WGBs 108 may receive DL MU PPDUs from the AP 104 simultaneously during a given DL time interval. For example, by using DL MU OFDMA techniques during a given UL time interval, multiple WGBs 108 may receive DL MU PPDUs from the AP 104 via different respective OFDMA RUs allocated by the AP 104. In another example, by using DL MU-MIMO techniques during a given DL time interval, multiple WGBs 108 may receive DL MU PPDUs from the AP 104 via different respective spatial streams allocated by the AP 104.

To manage access, the AP 104 may transmit a HEW master-sync transmission, which may be a TF or a control and schedule reception, at the beginning of the control period. The AP 104 may transmit a time duration of the Receive Opportunity (RXOP) and sub-channel information. During the HEW control period, HEW WGBs 108 may communicate with the AP 104 in accordance with a non-contention based multiple access technique, such as OFDMA or MU-MIMO. During the HEW control period, the AP 104 may communicate with stations 108 using one or more control frames, and the WGBs 108 may operate on a sub-channel smaller than the operating range of the AP 104.

During the HEW master-sync transmission, the WGBs 108 may contend for the wireless medium with the legacy devices 108 being excluded from contending for the wireless medium during the HEW master-sync transmission. The TF used during this HEW master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The WGBs 108 can function to provide wired client STAs 112 access to the WLAN 100. The client STAs 122 can be any type of device, for example, an IOT device, which may not have wireless capability. The WGB 108 provides the wireless functionality and can control or coordinate UL and DL transmissions to and from the STAs 112. Further, two or more WGBs 108a, 108b may be associated with a same VLAN 116. In this way, transmissions to the VLAN 116 may be sent to the WGBs 108 associated therewith. The VLAN can be a broadcast domain that is partitioned and isolated in the environment 100 at the data link layer (Layer 2).

Figure 2A:
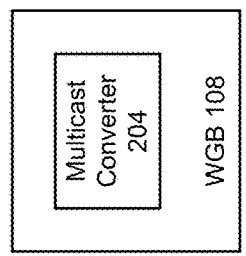
FIG. 2A illustrates a WGB in accordance with aspects of the current disclosure.

An embodiment of a WGB 108 may be as shown in FIG. 2A. The WGB 108 can include at least a multicast converter 204. The multicast converter 204 can receive multicast messages from the AP 104. These multicast messages may be converted or reconverted into a broadcast message to be sent to the one or more client STAs 112. As such the address format or information within the address fields for any message to be sent to the client STAs 112 may be changed by the multicast converter 204 as described hereinafter.

Figure 2B:
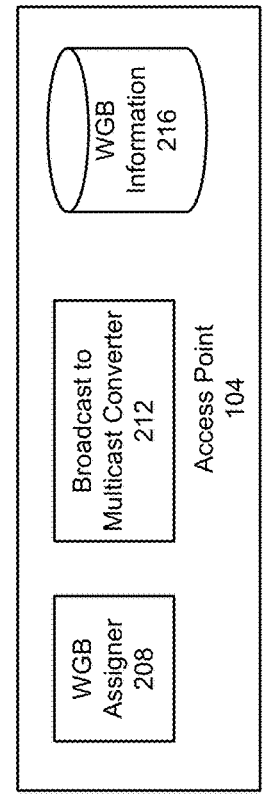
FIG. 2B illustrates an AP in accordance with aspects of the current disclosure.

An example of an AP 104 may be as shown in FIG. 2B. The AP 104 can include one or more of, but is not limited to, a WGB assigner 208, a broadcast to multicast converter 212, and/or WGB information data storage 216. The work group assigner 208 can receive information, in Inter Access Point Protocol (IAPP) messages, sent from the WGBs 108 and associated with the STAs 112. The IAPP messages can include information about the one or more wired clients 112 that may be associated with the WGB 108 and/or the AP 104. This information can include identification of the WGB 108, the VLAN 116, and/or the client station 112. One or more of these items of information may be stored by the work group assigner 208 into a work group information data store. The information may be stored in one or more data structures described hereinafter in conjunction with FIG. 4A and stored in WGB Information data storage 216.

The broadcast to multicast converter 212 can receive broadcast messages, at the AP 104, and destined for one or more client STAs 112. These broadcast messages may be converted to multicast messages to be sent to one or more WGBs 108 as one or more separate unicast messages contemporaneously transmitted from the AP 104 to the WGBs 108. Thus, the broadcast to multicast converter 212 can change the address format of the broadcast message based on information in the WGB information data store to convert the broadcast message to multicast messages. The address format may be as described as in data structure 424 of FIG. 4B.

An example of a first signaling process 300 between wired client 112, one or more WGBs 108, and an AP 104 may be as shown in FIG. 3A. A wired client station 112 may associate with a WGB 108 in one or more signals 304. The association of the client 112 can also be with the VLAN 116, AP 104, and/or BSS 100. The association may be transformed from by the WGB 108 into an IAPP message 308 sent from the WGB 108 to the AP 104. Information in the IAPP message 308 may include the information in data structure 404 that can be stored or associated with the WGB 108 and/or a data store. The AP 104 thus extracts information from the IAPP to associate the WGB 108 with the VLAN 116 and/or the client 112 with the VLAN 116 or group.

Sometime thereinafter, the AP 104 can receive a broadcast message 312 that may be destined for one or more client STAs 112. The AP 104 can transform this broadcast message 312 into a set of unicast messages or multicast messages 316a, 316b, 316c. These unicast messages may be sent directly to one or more WGBs 108*a*, 108*b* and addressed to the WGBs 108 based on information extracted from the IAPP messages. The WGB 108 can then receive the multicast message 316*a*, 316*b*, or 316*c*. These multicast message may look like a unicast message to the WGB 108 and be rebuilt into an 802.3 message, sent to the client station 112, as represented by signal 320. In this way, the WGB 108 can convert the multicast message for the client station 112 including whatever necessary address information required by the STA 112.

Because the broadcast message 312 destined for the STAs 112 are reformatted to multicast messages, the WGB 108 may need to send an acknowledgement of the reception of the signal back to the AP 104. If no acknowledgement is sent, the AP 104 can recognize that the WGB 108 did not receive the appropriate message and may re-transmit that message. In this way, messages sent to client stations 112 through the WGB 108, in the scenario shown in FIG. 3, may be more robust as re-transmission is now possible.

Figure 3B:
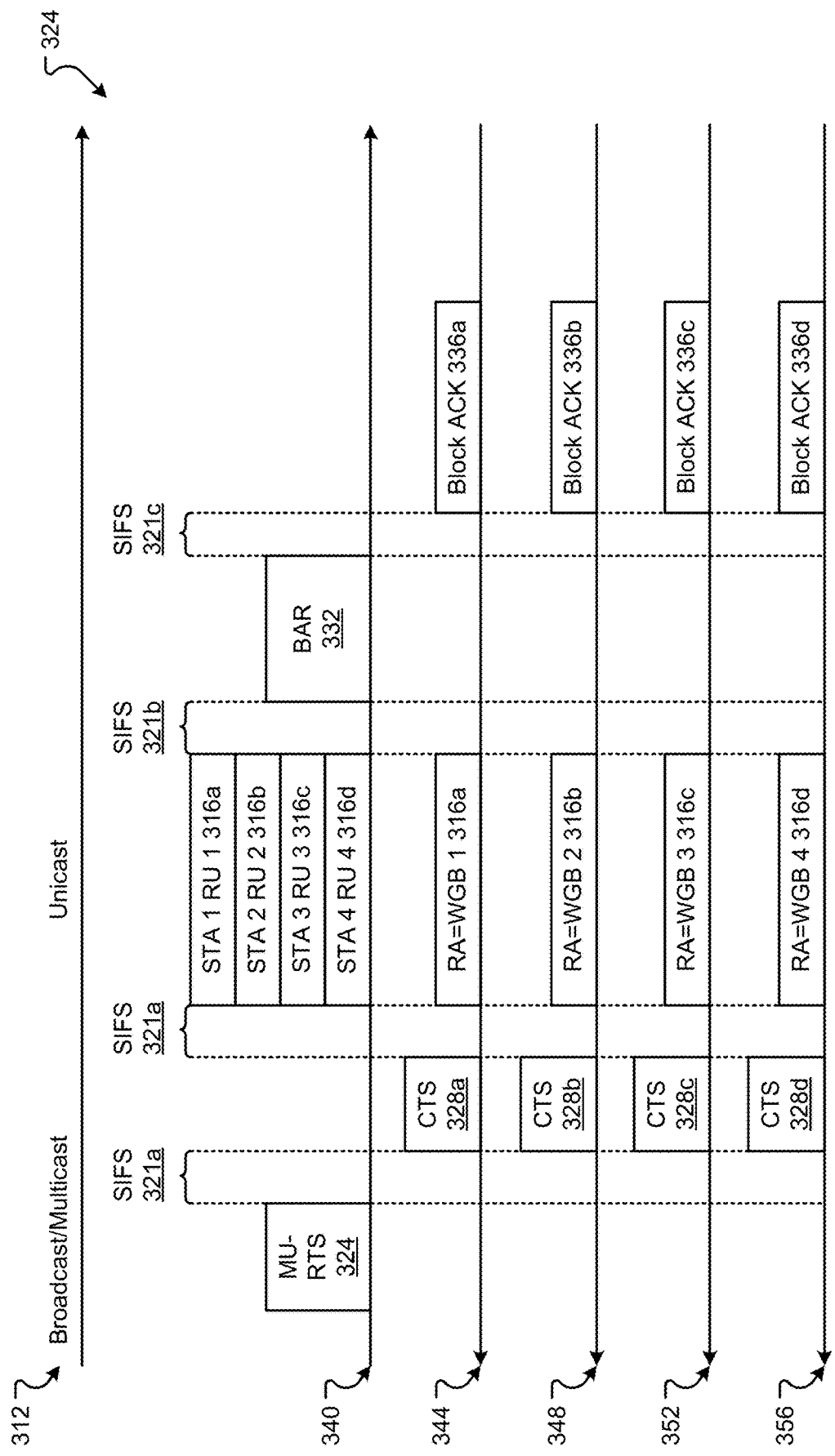
FIG. 3B illustrates another signaling process in accordance with aspects of the current disclosure.

Another signaling diagram 324 that shows more detail regarding the process of sending multicast messages 316 may be as shown in FIG. 3B. In the diagram 324, messages along line 340 are sent out from the AP 104 to the WGBs 108. Messages along lines 344, 348, 352, and/or 356 are sent from the WGBs 108 to the AP 104.

As shown in FIG. 3B, an AP 104 can receive a broadcast message 312. The AP 104 may then send a Multiple User Ready To Send (MU-RTS) message 324 to the various WGBs 108 associated with the broadcast message. In other words, the AP 104 can extract the group identifier, which may be the VLAN ID associated with each of the WGBs 108 received by the extraction of IAPP information. The AP 104 may then construct a MU-RTS messages 324 that are directed to each of those WGBs 104 associated with the VLAN ID. The MU-RTS message 324 can include an assignment of RU for each of the WGBs 108. This trigger frame can be sent to each of the WGBs 108 to receive this message and then wait for a response.

The AP 104 can then receive one or more clear to send (CTS) messages 328 from one or more of the different WGBs 108. Each of the CTS messages 328 are sent in the RU assigned by the AP 104 with the MU-RTS trigger frame 324. Upon receiving the CTS messages 328, the AP 104 can then send the physical layer conversions protocol (PLCP) protocol data unit (PPDU) down link message 316*a*-316*d* on the various resource units. These message 316 contain the actual data received in the broadcast message and may be directed over the various RUs used by the one or more WGBs 108. For example, WGB 1 receives message 316*a* over a first RU, while WBG 2 and WBG 3 receive the data of the broadcast message 312, in signals 316*b* and 316*c* respectively, that are sent contemporaneously in different RUs.

After sending the DL-PPDU, the AP 104 can require an acknowledgement, which may be requested by the AP in a Block Acknowledgment Request (BAR) signal 332 sent to all of the recipients of the DL-PPDU 316. In response to the BAR 332, one or more of the WGBs 108 can then send a block ACK 336*a*, 336*b*, 336*c*, 336*d*. This acknowledgement 336 indicates that the WGB 108 received the DL-PPDU 316. If a block ACK 336 is not received, the AP 104 can re-transmit the DL-PPDU 316 in another RU or different frame. In this way, the transmissions of broadcast messages 312 to client STAs 112 is more robust as re-transmission of the information is possible to the WGB 108 in this multicast situation.

An example data store 400 which may comprise data structures that may be sent, received, managed, stored, etc. either in signals shown in FIGS. 3A and 3B or in a data store may be shown in FIGS. 4A and 4B. The first data structure 404 can represent information received through an IAPP message 304 and/or stored or associated in a WGB information data store. Data structure 404 can include one or more of, but is not limited to, a WGB identifier 408 and/or a VLAN identifier 412. There may be more or fewer fields in data structure 404 as represented by ellipses 316. Each of the various IAPP messages 308 and each WGB 108 or VLAN 116 may have various other associations which may be represented by ellipses 420.

The WG identifier 408 can include any type of identifier that uniquely identifies the WGB 108 from other WGBs 108. Thus, the WGB ID 408 can include one or more of, but is not limited to, a Media Access Control (MAC) address, a Uniform Resource Locator (URL), a numeric ID, an alpha numeric ID, a globally unique identifier (GUID), or other types of identifiers. The identifier 408 may be sent in a frame for the IAPP message 304 sent from the WGB 108 to the AP 104. This ID 408 may then be stored with other information in the WGB information data store.

A VLAN ID 412 can include any ID that uniquely identifies the VLAN 116 in respect to other VLANS that may be present. Thus, the VLAN ID 412 can include one or more of but is not limited to, a URL, a numeric ID, an alpha numeric ID, a GUID, or other types of IDs. This VLAN ID 412 can be associated with the WGB ID 408 and stored in the WG information data store. As such, any broadcast message directed to the VLAN 116 by containing the VLAN ID 412 may be sent as a multicast message to the WGB 108 based on the WGB identifier 408 being associated with data structure 404 and with the VLAN ID 412. Each WGB 108 can have one or more associations with different VLAN IDs 412. As such each, WGB ID 408 can be associated with two or more VLAN IDs 412. Likewise, each VLAN ID 412 can be associated with one or more different WGBs 108. As such each VLAN ID 412 can have one or more data structures 404 associated with one or more other WGB IDs 408.

A new multicast message 316, derived from a broadcast message 312, may be as shown in data structure 424 of FIG. 4B. The broadcast message 312 can have a three address message with data 444. Here, the multicast message 424 can include an additional fourth address. As such, the data structure 424 can include one or more of, but is not limited to, a Source Address (SA) or address 1 428, a Basic Service Set Identifier (BSSID) or address 2 432, a Receiver Address (RA) or address 3 436, a Destination Address (DA) or address 4 440, and/or data 444. There may be more or fewer fields in data structure 424 as represented by a ellipses 448. Each of the multicast messages 316 may have a different data structure being sent from AP 104 to WGBs 108, as represented by ellipses 452.

The SA 428 is the address of the AP 104 and/or the sender of the original message. The BSS ID 432 may be the identifier of the BSS 100 associated with the WGB 108 and/or client STAs 112. The RA 436 can include the identifier 408 of the WGB 108. This new RA 436 can include the identifying information for the WGB 108 to indicate that the message is directed towards that WGB 108. The DA 440 can be the VLAN ID 412 and/or some other group identifier that includes the client station 112. This fourth address 440 may be included in the broadcast message 412 as the destination address. The data 444 can include any of the information for the DL-PPDU data that is to be sent from the AP 104 through the WGB 108 to the wired client 112.

The DA 440 can include a MAC address where the least significant bits represent the VLAN ID 412. For example, the first set of significant bits in the MAC address from the broadcast ID may be changed to the VLAN ID 412. In this way, the WGB 108 can determine which client STAs 112 are to be sent the message data 444 based on the VLAN ID 412. Any client station 112, of the VLAN 116, may be sent the message 316 from the WGB 108 based on this least significant bits having the VLAN ID 412 information. In this way, a broadcast message 312 to various VLANs 116 may be changed from a broadcast message 312 into a set of multicast messages or one or more unicast messages directed to the WBGs 108 that may then extract or change the unicast message 316 into a broadcast message 320 towards client STAs 112. However, the transmission from the AP 104 to the WGBs 108 is more robust as the multicast messages 316 can be retransmitted if transmission fails.

Figure 5A:
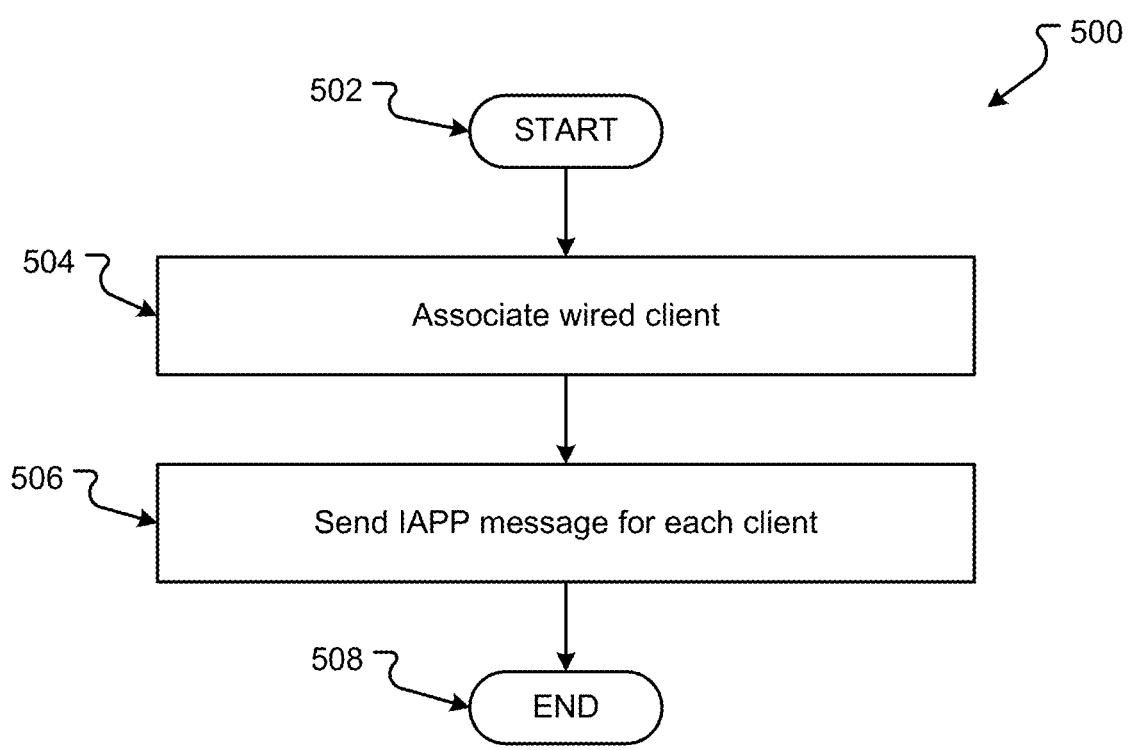
FIG. 5A illustrates a process for generating associations of WGB and clients, as conducted at a WGB, in accordance with aspects of the current disclosure.
Figure 5B:
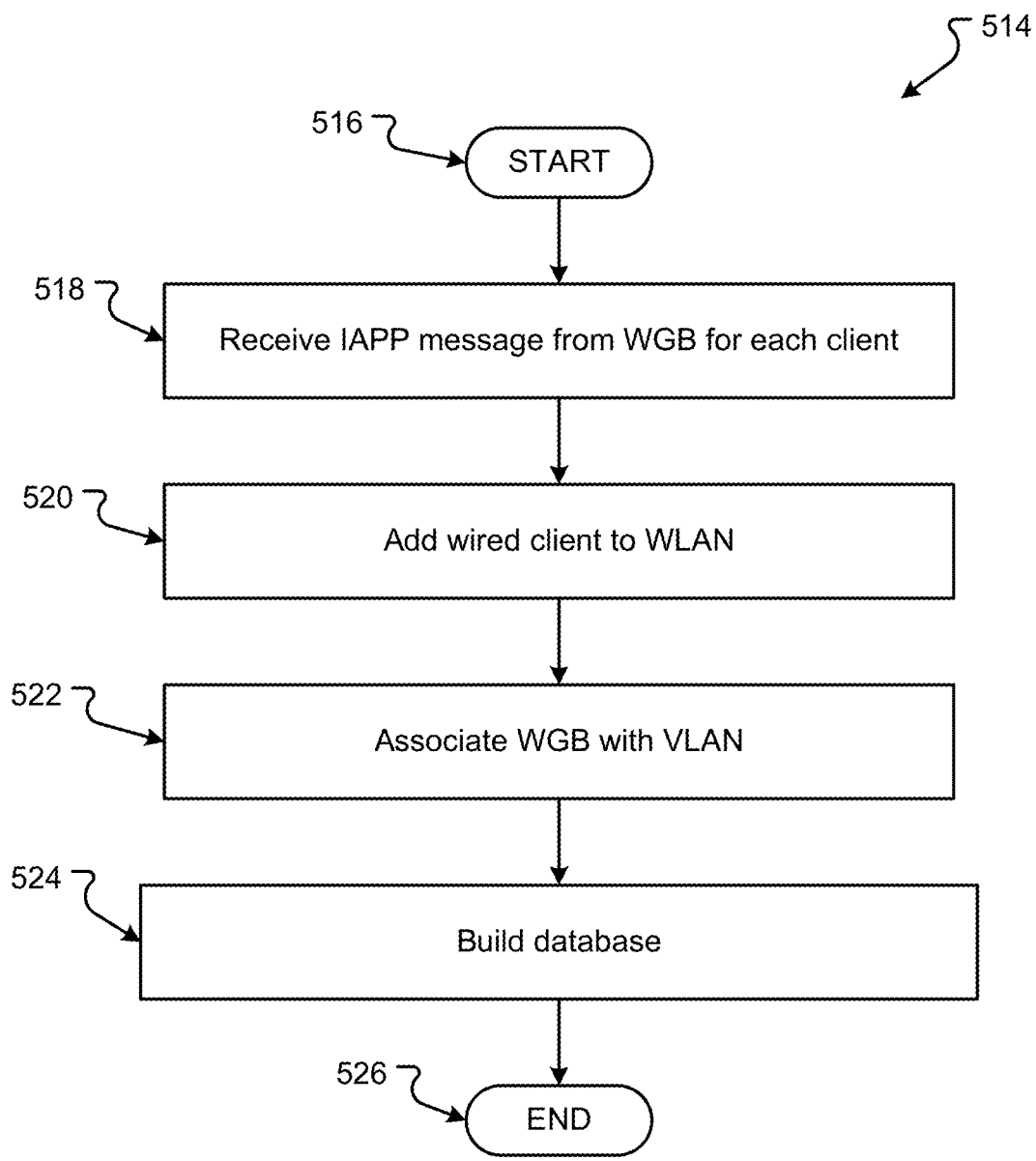
FIG. 5B illustrates a process for generating associations of WGB and clients, as conducted at an AP, in accordance with aspects of the current disclosure.

An example of a method 500 conducted by a WGB 108 for sending information about wired clients 112 associations may be as shown in FIG. 5A. A related method 520 is conducted by an AP 104 for receiving such information and may be as shown in FIG. 5B. These two methods 500 and 520 will be described in conjunction hereinafter.

A wired client station 112 can associate with a WGB 108 and a VLAN 116, in stage 508. The association 304 of the wired client with the WGB 108 and VLAN 116 can cause the WGB 108 to send an IAPP message 308 for that client STA 112 and, possibly, for other STAs 112 to an AP 104, in stage 512. The IAPP message may be sent as signal 308 from WBG 108 to AP 104. The IAPP message 308 can include one or more of the data items in data structure 404. This information is provided by the wired client STA 112 through the association signal 304.

AP 104 can receive the IAPP message 308 from the WGB 108 for each of the wired clients 112, in stage 512. Thus, stage 512 represents two or more messages or signals 308 sent from the WGB 108 to the AP 104. Then, steps 520 through 540 may be repeated for each of the IAPP messages 308 received from WGBs 108 associated with each of the wired client STAs 112.

The AP 104 can then add the wired client STA 112 to the WLAN 100, in stage 520. The wired client 112 can be associated with the BSS 100 in one or more data structures stored in a data store. Thus, the wired client STA 112 may also associated as member of a group or VLAN 116.

The AP 104 may then associate the WBG 108 with the VLAN 116, in stage 522. Thus, the AP 104 can extract the VLAN ID 412 in data structure 404 and associate that ID 412 with the WGB ID 408, which may be part of a higher level data structure that indicates the WGB ID 408. This association allows the AP 104 to send messages directly to the WGB 108 when directed to the VLAN 116 rather than to the WGB 108. The AP 104 then can build the data store with these associations or data structures 404. The data store may be stored locally at the AP 104 or may be stored remotely and allow access by the AP 104.

Figure 6A:
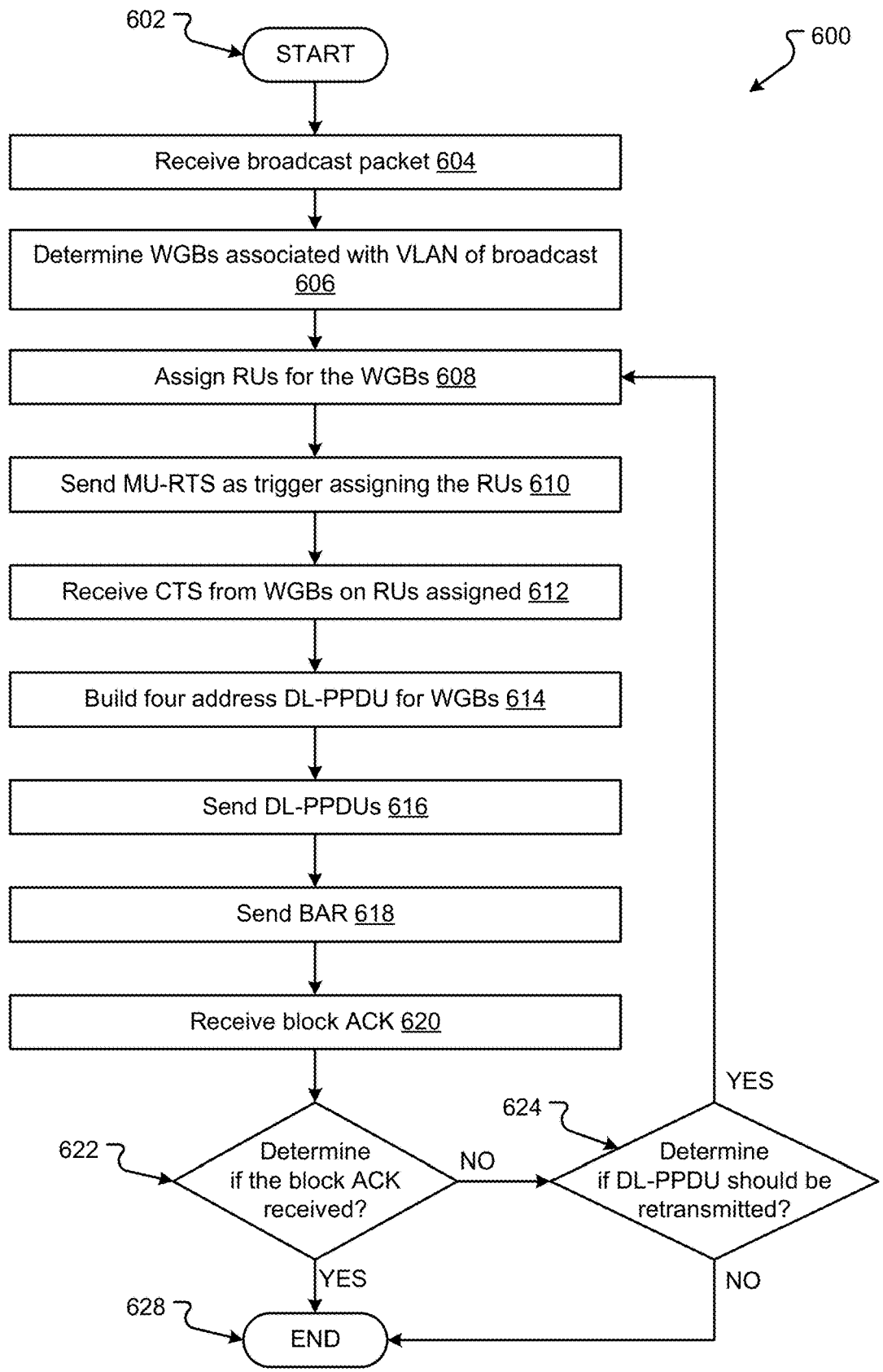
FIG. 6A illustrates a process for sending messages to a WGB and clients associated therewith, as conducted at an AP, in accordance with aspects of the current disclosure.
Figure 6B:
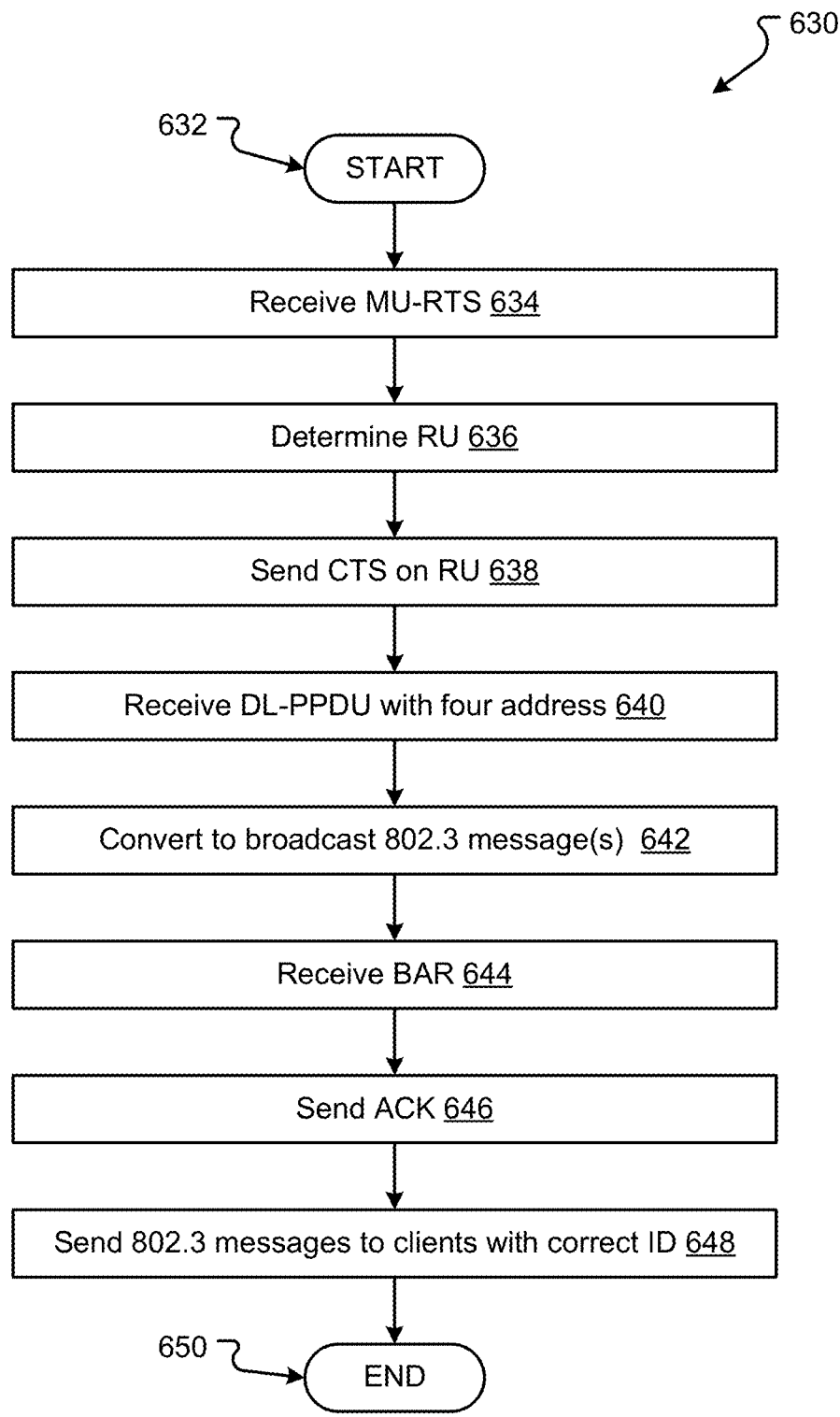
FIG. 6B illustrates a process for sending messages to a WGB and clients associated therewith, as conducted at a WGB, in accordance with aspects of the current disclosure; The FIG. 6B in drawing file put BAR and ACK (646, 648) after 802.3 forwarding (642,644). BAR and ACK are supposed to happen before 802.3 forwarding. The order is supposed to be: Receive DL-PPDU with four address, Receive BAR (or remove this item), Send ACK, Convert to broadcast 802.3 message(s), Send 802.3 messages to clients with correct ID.

A method 600 that may be performed by the AP 104 for changing a broadcast message to a multicast message sent to one or more WGBs 108, associated with the VLAN 116, may be as shown in FIG. 6A. A related method 630, performed by the WGB 108, for receiving the multicast or unicast message from the AP 104 and transforming that to a broadcast message to one or more wire clients 112 may be as shown in FIG. 6B. The methods 600 and 630 shown in FIGS. 6A and 6B will be described herein in conjunction with each other.

The AP 104 can receive a broadcast packet 312, in stage 604. The packet 312 can include data for one or more client STAs 112 and may be associated with a group, for example, VLAN 116. As such, the broadcast packet 312 can include group information that can identify client STAs 112 which may then also be associated with the WGB 108 at the AP 104. The AP 104 can then determine which WBGs 108 are associated with that group ID, for example the VLAN ID 116, in the broadcast packet 312, in stage 606. To determine the WGBs 108 associated with the VLAN ID, the AP 104 can access the WGB information in data store 400. In data store 400, one or more data structures 404 may be present and retrieved. Each of these data structures 404 can include the VLAN ID 412 which may be associated with the one or more WGB IDs 408.

The WGB ID 408 associated with the VLAN IDs 412 may be then be extracted and used by the AP 104 for assigning RUs to the WBGs 108, in stage 608. The AP 104 can assign the RUs in a trigger frame 424. The trigger frame 424 can be a MU-RTS frame 324 that can include an RU assignment for each WGB 108. This trigger frame 324 may be sent to all WBGs 108 in the BSS 102 or VLAN 116.

Each WGB 108 can then receive the trigger frame 324, for example, the MU-RTS frame 324, in stage 634. The WGB 108 can be directly identified by the WGB ID 408 in the trigger frame 324. The trigger frame 324 can also include the RU assignment. Thus, the WGB 108 can determine which RU it is assigned, in stage 636. Upon determining the RU and determining that the WGB 108 is able to receive data, the WGB 108 can send the CTS frame 328, on the assigned RU, in stage 638. The CTS 328 acknowledges that the WGB 108 has received the trigger frame 324 and has also determined the correct RU for that WGB 108.

After sending the MU-RTS trigger frame 324, the AP 104 can wait to receive the CTS signals 328a-328d from the one or more WGBs 108, in stage 612. Upon receiving the CTS frames 328, the AP 104 can wait for the Short Inter-frame Space (SIFS) 321 before sending the data 316. During this time, the AP 104 can build the four address data packet 424 for the WGBs 108, in stage 614. Here, the data structure 424 can be a DL-PPDU including the WGB 108 in the RA 436.

The AP 104 can then send the DL-PPDUs, as signals 316, in stage 616. The WGB 108 can receive these DL-PPDUs, in stage 640. Each WGB 108 can then refer to the data 444 and convert the message 316 into an 802.3 message 320 for one or more client STAs 112, in stage 642. The WGB 108 can extract the data 444, in the destination address 440, and broadcast the data 444 to one or more client STAs 112, in message 320. After another SIFS period 321b, the AP 104 can then send a BAR 332 to the WGBs 108, in stage 618. The WGBs 108 can receive the BAR 332, in stage 644. Each of the WGBs 108 may then send a block acknowledgement 336 back to the AP 104, in stage 646. The message 320 is sent to the clients 112, with the correct ID, whether the group ID is a VLAN ID 412 or the client STA ID, in stage 648.

In stage 620, the AP receives the block acknowledgements 336. At this point, the AP 104 can determine whether or not the WGB 108 received the data in the transmission 316. Thus, the AP 104 can determine whether the block acknowledgement 336 is received from each of the WGBs 108 that were transmitted messages 316. If each of the WGBs 108 did send a block acknowledgement 336, the method 600 may proceed YES to end operations 628. However, if one or more WGBs 108 did not send a block acknowledgement 336, the method 600 may NO proceed to stage 624.

In step 624, the AP 104 can determine if the data 444 needs to be retransmitted to the WGB 108. If the block acknowledgement 332 is not received, the AP 104 can automatically determine that a retransmission of the data may be needed. However, in other situations, even without a block acknowledgement 332 being received, the AP 104 may determine that retransmissions is not required. If the transmission is required, the method 600 proceeds YES back to step 608 to reassign an RU for that WGB 108 in another frame. Stages 608 through 620 may then be repeated for that retransmission. If the AP 104 determines that retransmission is not required, the method 600 may proceed NO to end operations 628.

FIG. 7 illustrates an embodiment of a communications device 700 that may implement one or more of APs 104, controllers 101, WGBs 108, and/or STAs 112 of FIG. 1. In various embodiments, device 700 may comprise a logic circuit. The logic circuit may include physical circuits to perform operations described for one or more of APs 104, controllers 101, WGBs 108, and/or STAs 112 of FIG. 1, for example. As shown in FIG. 7, device 700 may include one or more of, but is not limited to, a radio interface 710, baseband circuitry 720, and/or computing platform 730.

The device 700 may implement some or all of the structures and/or operations for one or more of APs 104, controllers 101, WGBs 108, and/or STAs 112 of FIG. 1, storage medium 760, and logic circuit in a single computing entity, such as entirely within a single device. Alternatively, the device 700 may distribute portions of the structure and/or operations using a distributed system architecture, such as a client-server architecture, a peer-to-peer architecture, a master-slave architecture, etc.

An radio interface 710, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 710 may include, for example, a receiver 712 and/or a transmitter 716. Radio interface 710 may include bias controls, a crystal oscillator, and/or one or more antennas 718. In additional or alternative configurations, the radio interface 710 may use oscillators and/or one or more filters, as desired.

Baseband circuitry 720 may communicate with radio interface 710 to process, receive, and/or transmit signals and may include, for example, an Analog-To-Digital Converter (ADC) for down converting received signals with a Digital-To-Analog Converter (DAC) 722 for up converting signals for transmission. Further, baseband circuitry 720 may include a baseband or PHYsical layer (PHY) processing circuit for the PHY link layer processing of respective receive/transmit signals. Baseband circuitry 720 may include, for example, a Medium Access Control (MAC) processing circuit 727 for MAC/data link layer processing. Baseband circuitry 720 may include a memory controller for communicating with MAC processing circuit 727 and/or a computing platform 730, for example, via one or more interfaces 734.

In some configurations, PHY processing circuit may include a frame construction and/or detection module, in combination with additional circuitry such as a buffer memory, to construct and/or deconstruct communication frames. Alternatively or in addition, MAC processing circuit 727 may share processing for certain of these functions or perform these processes independent of PHY processing circuit. In some configurations, MAC and PHY processing may be integrated into a single circuit.

The computing platform 730 may provide computing functionality for the device 700. As shown, the computing platform 730 may include a processing component 728. In addition to, or alternatively of, the baseband circuitry 720, the device 700 may execute processing operations or logic for one or more of APs 104, controllers 101, WGBs 108, and/or STAs 112, storage medium 760, and logic circuits using the memory components 760. The processing component 728 (and/or PHY and/or MAC 727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 760 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices (e.g., Universal Serial Bus (USB) memory, Solid State Drives (SSD) and any other type of storage media suitable for storing information.

Device 700 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using Single Input Single Output (SISO) architectures. However, certain implementations may include multiple antennas (e.g., antennas 718) for transmission and/or reception using adaptive antenna techniques for beamforming or Spatial Division Multiple Access (SDMA) and/or using MIMO communication techniques.

The components and features of device 700 may be implemented using any combination of discrete circuitry, Application Specific Integrated Circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 7 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 7 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 727. The network access unit can also work and interact with one or more of the modules/components described herein.

It should be appreciated that the exemplary device 700 shown in the block diagram of FIG. 7 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspects of the disclosure comprise a method comprising: receiving, at an Access Point (AP), a broadcast packet destined for two or more client Stations (STAs), wherein the two or more client STAs are connected to a Workgroup Bridge (WGB); modifying the broadcast packet, by the AP, into two or more addressed packets, wherein the two or more addressed packets are addressed to the two or more client STAs separately; and sending the two or more addressed packets to the WGB to relay to the two or more client STAs.

Any of the one or more above aspects, wherein the two or more addressed packets can include four addresses.

Any of the one or more above aspects, wherein the four addresses includes a destination address, a receiver address, a source address, and a Basic Service Set Identifier (BSSID).

Any of the one or more above aspects, wherein the receiver address comprises an identifier for the WGB.

Any of the one or more above aspects, wherein the destination address is a group identifier for a group that includes the client STA.

Any of the one or more above aspects, wherein the group identifier is a Virtual Local Area Network (VLAN) Identifier (VLAN ID) of a VLAN to which the client STA is associated.

Any of the one or more above aspects, further comprising: assigning a Resource Unit (RU) to each of two or more WGBs to receive one of the two or more addressed packets.

Any of the one or more above aspects, further comprising: receiving a Clear To Send (CTS) response from the two or more WGBs.

Any of the one or more above aspects, further comprising: sending, to each of two or more WGBs, one of the two or more addressed packets over the RU assigned; sending a Block Acknowledgement Request (BAR), to each of two or more WGBs, over the RU assigned; and receiving a Block Acknowledgement (ACK) for one or more of the two or more WGBs.

Any of the one or more above aspects, further comprising: determining if the Block ACK is received from each of the two or more WGBs; and when a Block ACK is not received from a WGB, resending the addressed packet to the WGB.

Aspects of the disclosure further comprise an access point (AP) comprising: a radio operable to receive a signal from a second AP of a second Basic Service Set (BSS); a memory; a processor in communication with the memory and the radio, the processor operable to: receive a broadcast packet destined for two or more client Stations (STAs), wherein the two or more client STAs are connected to a Workgroup Bridge (WGB); modify the broadcast packet into two or more addressed packets, wherein the two or more addressed packets are addressed to the two or more client STAs separately; and send the two or more addressed packets to the WGB to relay to the two or more client STAs.

Any of the one or more above aspects, wherein the two or more addressed packets can include four addresses, wherein the four addresses includes a destination address, a receiver address, a source address, and a Basic Service Set Identifier (BSSID), wherein the receiver address comprises an identifier for the WGB, and wherein the destination address is a group identifier for a group that includes the client STA.

Any of the one or more above aspects, wherein the group identifier is a Virtual Local Area Network (VLAN) Identifier (VLAN ID) of a VLAN to which the client STA is associated.

Any of the one or more above aspects, wherein the processor is further operable to: assign a Resource Unit (RU) to each of two or more WGBs to receive one of the two or more addressed packets; receive a Clear To Send (CTS) response from the two or more WGBs; and send, to each of two or more WGBs, one of the two or more addressed packets over the RU assigned.

Any of the one or more above aspects, wherein the processor is further operable to: send Block Acknowledgement Request (BAR), to each of two or more WGBs, over the RU assigned; receive a Block Acknowledgement (ACK) for one or more of the two or more WGBs; determine if the Block ACK is received from each of the two or more WGBs; and when a Block ACK is not received from a WGB, resending the addressed packet to the WGB.

Aspects of the disclosure further comprise a basic service set comprising: a first access point (AP) operable to: receive a broadcast packet destined for two or more client Stations (STAs), wherein the two or more client STAs are connected to two or more Workgroup Bridges (WGBs); modify the broadcast packet into two or more addressed packets, wherein the two or more addressed packets are addressed to the two or more client STAs separately; assign a Resource Unit (RU) to each of two or more WGBs to receive one of the two or more addressed packets; receive a Clear To Send (CTS) response from the two or more WGBs; and send, to each of two or more WGBs, one of the two or more addressed packets over the RU assigned; the WGB operable to: receive the assignment of the RU from the AP; send the CTS response to the AP over the RU assigned; and receive one of the two or more addressed packets over the RU assigned.

Any of the one or more above aspects, wherein WGB operable to: convert the received packet into a broadcast packet for the two or more client STAs connected to the WGB.

Any of the one or more above aspects, wherein the two or more addressed packets can include four addresses, wherein the four addresses includes a destination address, a receiver address, a source address, and a Basic Service Set Identifier (BSSID), wherein the receiver address comprises an identifier for the WGB, and wherein the destination address is a group identifier for a group that includes the client STA.

Any of the one or more above aspects, wherein the WGB determines to which client STA to send the received packet based on the group identifier.

Any of the one or more above aspects, wherein the WGB is further operable to: when the addressed packet is received over the RU assigned: receive a Block Acknowledgement Request (BAR) from the AP, over the RU assigned; send a Block Acknowledgement (ACK) to the AP; when the addressed packet is not received over the RU assigned: receiving the addressed packet in another transmission from the AP.

What is claimed is:

1. A method comprising:
receiving, at an Access Point (AP), a broadcast packet destined for two or more client Stations (STAs), wherein the two or more client STAs are connected to a Workgroup Bridge (WGB);
modifying the broadcast packet, by the AP, into two or more addressed packets, wherein the two or more addressed packets are addressed to the two or more client STAs separately; and
sending the two or more addressed packets to the WGB to relay to the two or more client STAs, wherein each of the two or more addressed packets can include four addresses, wherein the four addresses includes a destination address, a receiver address, a source address, and a Basic Service Set Identifier (BSSID), wherein the receiver address comprises an identifier for the WGB, and wherein the destination address is a group identifier for a group that includes at least one of the two or more client STAs.

2. The method of claim 1, wherein the group identifier is a Virtual Local Area Network (VLAN) Identifier (VLAN ID) of a VLAN to which the client STA is associated.

3. The method of claim 1, further comprising: assigning respective Resource Units (RUs) to two or more WGBs to receive one of the two or more addressed packets, wherein the WGB is included in the two or more WGBs.

4. The method of claim 3, further comprising: receiving a Clear To Send (CTS) response from the two or more WGBs prior to sending the two or more addressed packets to the WGB.

5. The method of claim 4, further comprising:
sending, to each of two or more WGBs respectively, one of the two or more addressed packets over the RU assigned;
sending a Block Acknowledgement Request (BAR), to each of two or more WGBs, over the RU assigned; and
receiving a Block Acknowledgement (ACK) for one or more of the two or more WGBs.

6. The method of claim 5, further comprising:
determining if the Block ACK is received from each of the two or more WGBs; and
when a Block ACK is not received from a one of the two or more WGBs, resending the one of the two or more addressed packet to the one of the two or more WGBs.

7. A access point (AP) comprising:
a radio operable to receive a signal from a second AP of a second Basic Service Set (BSS);
a memory;
a processor in communication with the memory and the radio, the processor operable to:
receive a broadcast packet destined for two or more client Stations (STAs), wherein the two or more client STAs are connected to a Workgroup Bridge (WGB);
modify the broadcast packet into two or more addressed packets, wherein the two or more addressed packets are addressed to the two or more client STAs separately; and
send the two or more addressed packets to the WGB to relay to the two or more client STAs, wherein each of the two or more addressed packets can include four addresses, wherein the four addresses includes a destination address, a receiver address, a source address, and a Basic Service Set Identifier (BSSID), wherein the receiver address comprises an identifier for the WGB, and wherein the destination address is a group identifier for a group that includes at least one of the two or more client STAs.

8. The AP of claim 7, wherein the group identifier is a Virtual Local Area Network (VLAN) Identifier (VLAN ID) of a VLAN to which the client STA is associated.

9. The AP of claim 7, wherein the processor is further operable to:
assign respective Resource Units (RUs) to two or more WGBs to receive one of the two or more addressed packets, wherein the WGB is included in the two or more WGBs;
receive a Clear To Send (CTS) response from the two or more WGBs prior to sending the two or more addressed packets to the WGB; and
send, to each of two or more WGBs respectively, one of the two or more addressed packets over the RU assigned.

10. The AP of claim 7, wherein the processor is further operable to:
send Block Acknowledgement Request (BAR), to each of two or more WGBs, over the RU assigned;
receive a Block Acknowledgement (ACK) for one or more of the two or more WGBs packets, wherein the WGB is included in the two or more WGBs;
determine if the Block ACK is received from each of the two or more WGBs; and
when a Block ACK is not received from a one of the two or more WGBs, resending the addressed packet to the one of the two or more WGBs.

11. A method comprising:
receiving, at an Access Point (AP), a broadcast packet destined for two or more client Stations (STAs), wherein the two or more client STAs are connected to a Workgroup Bridge (WGB);
modifying the broadcast packet, by the AP, into two or more addressed packets, wherein the two or more addressed packets are addressed to the two or more client STAs separately;
sending the two or more addressed packets to the WGB to relay to the two or more client STAs; and
assigning respective Resource Units (RUs) to two or more WGBs to receive one of the two or more addressed packets, wherein the WGB is included in the two or more WGBs.

12. The method of claim 11, further comprising: receiving a Clear To Send (CTS) response from the two or more WGBs prior to sending the two or more addressed packets to the WGB.

13. The method of claim 12, further comprising:
sending, to each of two or more WGBs respectively, one of the two or more addressed packets over the RU assigned;
sending a Block Acknowledgement Request (BAR), to each of two or more WGBs, over the RU assigned; and receiving a Block Acknowledgement (ACK) for one or more of the two or more WGBs.

14. The method of claim 13, further comprising:

determining if the Block ACK is received from each of the two or more WGBs; and when a Block ACK is not received from a one of the two or more WGBs, resending the one of the two or more addressed packet to the one of the two or more WGBs.

\* \* \* \* \*